US012526201B2

United States Patent
Alabbasi et al.

(10) Patent No.: US 12,526,201 B2
(45) Date of Patent: Jan. 13, 2026

(54) ADAPTIVE PREDICTION OF TIME HORIZON FOR KEY PERFORMANCE INDICATOR

(71) Applicant: Telefonaktiebolaget LM Ericsson (publ), Stockholm (SE)

(72) Inventors: Abdulrahman Alabbasi, Kista (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/702,869

(22) PCT Filed: Feb. 10, 2022

(86) PCT No.: PCT/EP2022/053298
§ 371 (c)(1),
(2) Date: Apr. 19, 2024

(87) PCT Pub. No.: WO2023/066529
PCT Pub. Date: Apr. 27, 2023

(65) Prior Publication Data
US 2025/0233800 A1  Jul. 17, 2025

(30) Foreign Application Priority Data
Oct. 20, 2021 (GR) .............................. 20210100718

(51) Int. Cl.
*H04L 41/147* (2022.01)
*H04L 5/00* (2006.01)
(Continued)

(52) U.S. Cl.
CPC ............ *H04L 41/147* (2013.01); *H04L 5/006* (2013.01); *H04L 41/5009* (2013.01); *H04W 24/10* (2013.01)

(58) Field of Classification Search
CPC ........ G06N 20/00; G06N 3/044; G06N 3/045; G06N 3/08; G06N 7/01; H04B 17/373;
(Continued)

(56) References Cited

U.S. PATENT DOCUMENTS

2021/0390434 A1* 12/2021 Bai ..................... H04W 24/02
2023/0164844 A1*  5/2023 Lei .................... H04W 74/0833
370/330

FOREIGN PATENT DOCUMENTS

AU       2009280498 A1 *  2/2011 .......... H04J 11/0069
WO    WO-2020213964 A1 * 10/2020 ............... G06N 3/04

OTHER PUBLICATIONS

International Search Report and Written Opinion of the International Searching Authority, PCT/EP2022/053298, mailed Jul. 15, 2022, 19 pages.
(Continued)

*Primary Examiner* — Christopher Biagini
(74) *Attorney, Agent, or Firm* — Sage Patent Group

(57) ABSTRACT

A method performed by a network node for an adaptive prediction of a time horizon for at least one key performance indicator, KPI, in a wireless network is provided. The method includes transmitting towards a user equipment, UE, a machine learning, ML, model to predict the at least one KPI; and receiving from the UE a first message including the predicted at least one KPI and a predicted time horizon for the predicted at least one KPI. A method performed by a UE is also provided.

20 Claims, 13 Drawing Sheets

| LCG_7 | LCG_6 | LCG_5 | LCG_4 | LCG_3 | LCG_2 | LCG_1 | LCG_0 | Oct 1 |
|---|---|---|---|---|---|---|---|---|
| Predicted Buffer Size 1 ||||||||| Oct 2 |
| Predicted Buffer Size 2 ||||||||| Oct 3 |
|  ||||||||| |
| Predicted Buffer Size m ||||||||| Oct m+1 |
| Value of the predicted time-horizon for all LCG_i ||||||||| Time Horizon |

(51) Int. Cl.
*H04L 41/5009* (2022.01)
*H04W 24/10* (2009.01)

(58) Field of Classification Search
CPC .............. H04B 17/3913; H04B 7/0626; H04J 11/0056; H04J 11/0059; H04L 1/0026; H04L 41/0816; H04L 41/147; H04L 41/16; H04L 41/5009; H04L 5/0048; H04L 5/0057; H04L 5/006; H04W 24/02; H04W 24/04; H04W 24/08; H04W 24/10; H04W 36/0085; H04W 72/542; H04W 8/24
See application file for complete search history.

(56) References Cited

OTHER PUBLICATIONS

Li, Yu-Ngok Ruyue et al., "Beam Management in Millimeter-Wave Communications for 5G and Beyond," IEEE Access, vol. 8, Dec. 31, 2019, 12 pages.

Zte et al., "Support of Artificial Intelligence Applications for 5G Advanced," 3GPP TSG RAN#93e, RP-212383, Electronic Meeting, Sep. 13-17, 2021, 20 pages.

China Academy of Telecommunications Technology (CATT), "AI/MLL for physical layer in Rel-18," 3GPP TSG RAN Rel-18 workshop, RWS-210413, Electronic Meeting, Jun. 28-Jul. 2, 2021, 10 pages.

3GPP TR 28.809 V17.0.0 (Mar. 2021); 3rd Generation Partnership Project; Technical Specification Group Services and System Aspects; Management and orchestration; Study on enhancement of Management Data Analytics (MDA) (Release 17), 96 pages.

Fujitsu Limited, "Study on AI for Air Interface Enhancement in Rel-18," 3GPP TSG RAN Rel-18 workshop, RWS-210291, Electric Meeting, Jun. 28-Jul. 2, 2021, 8 pages.

Makridis, Evagoras, "Reinforcement Learning for Link Adaptation in 5G-NR Networks," Master's Thesis, Nov. 3, 2020; Downloaded from the Internet on Oct. 14, 2021 from: https://kth.diva-portal.org/smash/get/diva2: 1527910/FULLTEXT01.pdf, 66 pages.

Lenovo et al., "Summary of offline discussion on AI RAN general framework," 3GPP TSG-RAN WG3 #113e, Draft R3-214220, Online, Aug. 16-26, 2021, 10 pages.

3GPP TS 38.331 V16.6.0 (Sep. 2021); 3rd Generation Partnership Project; Technical Specification Group Radio Access Network; NR; Radio Resource Control (RRC) protocol specification (Release 16), 961 pages.

3GPP TS 38.321 V16.6.0 (Sep. 2021); 3rd Generation Partnership Project; Technical Specification Group Radio Access Network; NR; Medium Access Control (MAC) protocol specification (Release 16), 158 pages.

* cited by examiner

| LCG_7 | LCG_6 | LCG_5 | LCG_4 | LCG_3 | LCG_2 | LCG_1 | LCG_0 | Oct 1 |
|---|---|---|---|---|---|---|---|---|
| Predicted Buffer Size 1 ||||||||  Oct 2 |
| Predicted Buffer Size 2 ||||||||  Oct 3 |
|  ||||||||  |
| Predicted Buffer Size m ||||||||  Oct m+1 |
| Value of the predicted time-horizon for all LCG_i ||||||||  Time Horizon |

Figure 1

Transmit towards a user equipment, UE, a machine learning, ML, model to predict at least one KPI
901

Receive from the UE a first message comprising the predicted at least one KPI and a predicted time horizon for the predicted at least one KPI
903

Use an original time horizon received from the UE to perform resource allocation for the UE and establish a channel between the network node and the UE    1001

Transmit towards a user equipment, UE, a machine learning, ML, model to predict at least one KPI    901

Receive from the UE a first message comprising the predicted at least one KPI and a predicted time horizon for the predicted at least one KPI    903

Track longevity of the channel between the network node and the UE    1003

Update predicted time horizon for the predicted at least one KPI based on the longevity of the channel    1005

Transmit to the UE the updated time horizon    1007

Provide feedback to the UE    1009

Receive second message from the UE comprising a change to the predicted time horizon for a future time period    1011

Figure 10

ADAPTIVE PREDICTION OF TIME HORIZON FOR KEY PERFORMANCE INDICATOR

CROSS REFERENCE TO RELATED APPLICATIONS

This application is a 35 U.S.C. § 371 national stage application of PCT International Application No. PCT/EP2022/053298 filed on Feb. 10, 2022, which in turn claims foreign priority to Greek Patent Application No. 20210100718, filed on Oct. 20, 2021, the disclosures and content of which are incorporated by reference herein in their entirety.

TECHNICAL FIELD

The present disclosure relates generally to methods for an adaptive prediction of a time horizon for at least one key performance indicator(s), KPI(s), and related methods and apparatuses.

BACKGROUND

Some approaches discuss radio link (RL) based link adaptation. See e.g., E. Makridis, "Reinforcement Learning for Link Adaptation in 5G-NR Networks, (3 Nov. 2020), https://kth.diva-portal.org/smash/get/diva2:1527910/FULLTEXT01.pdf (accessed on 14 Oct. 2021).

In some approaches for performing link adaptation, a user equipment (UE) can produce reports about, e.g., channel state information (CSI) data that provide possible future states of a channel between a user equipment (UE) and a network node having a varying time horizon for a number of future timesteps predicted in advance. A problem, however, may arise when there is variance in the time horizon each UE has because, e.g., such reports are not controlled by the network. Instead, such reports are governed by the capability of each UE and by how well a machine learning (ML) model at a UE performs. As a consequence, if a UE fails to get the expected accuracy for a given time horizon, the UE re-tries, in a trial and error process, to predict CSI using a smaller time horizon (e.g., instead of trying to predict channel state information for the next 2 hours, the UE re-tries for the next 1-hour, and so on).

SUMMARY

There currently exist certain challenges. Such a discrepancy in a time horizon for a UE may be problematic. Since, in existing approaches, a UE cannot determine the time horizon, the UE falls back to trial and error to determine what can be achieved. Such a trial and error approach may be wasteful since, in each case, the ML model may need to be re-trained and configured accordingly. Moreover, such a discrepancy may be problematic from the perspective of a radio base station resource scheduler because the scheduler may not be able to allocate resources in advance when dealing with predictions of variable time horizons since such predictions carry different guarantees about their validity.

Certain aspects of the disclosure and their embodiments may provide solutions to these or other challenges.

In various embodiments of the present disclosure, a method performed by a network node for an adaptive prediction of a time horizon for at least one KPI in a wireless network is provided. The method comprises transmitting towards UE a ML model to predict the at least one KPI. The method further comprises receiving from the UE a first message comprising the predicted at least one KPI and a predicted time horizon for the predicted at least one KPI.

In some embodiments, the method further comprises using an original time horizon received from the UE to perform resource allocation for the UE and establish a channel between the network node and the UE. The method further comprises tracking a longevity of the channel between the network node and the UE; updating the predicted time horizon for the predicted at least one KPI based on the longevity of the channel; and transmitting to the UE the updated time horizon.

In some embodiments, the method further comprises providing feedback to the UE. The feedback comprises information to enable the UE to update the predicted time horizon of the UE for a next training iteration.

In some embodiments, the ML model is deployed in an execution phase without further learning, and the method further comprises receiving a second message from the UE comprising a change to the predicted time horizon for a future time period, the change comprising one of an increase to the predicted time horizon or a decrease to the predicted time horizon based on a duration of the resource allocation compared to the predicted time horizon.

In other embodiments, a method performed by a UE for an adaptive prediction of a time horizon for at least one KPI in a wireless network is provided. The method comprises receiving from a network node a ML model to predict the at least one KPI. The method further comprises transmitting a first message towards the network node comprising the predicted at least one KPI and a predicted time horizon for the predicted at least one KPI.

In some embodiments, the method further comprises transmitting an original time horizon to the network node; receiving from the network node, a resource allocation for the UE for a channel established between the network node and the UE; and receiving an updated time horizon for the resource allocation on the channel from the network node.

In some embodiments, the method further comprises receiving feedback from the network node. The feedback containing information to enable the UE to update the predicted time horizon of the UE for a next training iteration.

In some embodiments, the ML model is deployed in an execution phase without further learning, and the method further comprises transmitting a second message towards the network node comprising a change to the predicted time horizon for a future time period, the change comprising one of an increase to the predicted time horizon or a decrease to the predicted time horizon based on a duration of the resource allocation compared to the predicted time horizon.

In other embodiments, a network node for an adaptive prediction of a time horizon for at least one KPI in a wireless network is provided. The network node includes at least one processor; and at least one memory connected to the at least one processor and storing program code that is executed by the at least one processor to perform operations. The operations comprise transmit towards UE a ML model to predict the at least one KPI. The operations further comprise receive from the UE a first message comprising the predicted at least one KPI and a predicted time horizon for the predicted at least one KPI.

In other embodiments, a network node adapted to perform operations for an adaptive prediction of a time horizon for at least one KPI in a wireless network is provided. The operations comprise transmit towards UE a ML model to predict the at least one KPI. The operations further comprise receive from the UE a first message comprising the predicted at least one KPI and a predicted time horizon for the predicted at least one KPI.

In other embodiments, a computer program comprising program code to be executed by processing circuitry of a network node for an adaptive prediction of a time horizon for at least one KPI in a wireless network is provided. Execution of the program code causes the network node to perform operations. The operations comprise transmit towards UE a ML model to predict the at least one KPI. The operations further comprise receive from the UE a first message comprising the predicted at least one KPI and a predicted time horizon for the predicted at least one KPI.

In other embodiments, a computer program product comprising a non-transitory storage medium including program code to be executed by processing circuitry of a network node for an adaptive prediction of a time horizon for at least one KPI in a wireless network is provided. Execution of the program code causes the network node to perform operations. The operations comprise transmit towards UE a ML model to predict the at least one KPI. The operations further comprise receive from the UE a first message comprising the predicted at least one KPI and a predicted time horizon for the predicted at least one KPI.

In other embodiments, a UE for an adaptive prediction of a time horizon for at least one KPI in a wireless network is provided. The UE comprises at least one processor; and at least one memory connected to the at least one processor and storing program code that is executed by the at least one processor to perform operations. The operations comprise receive from a network node a ML model to predict the at least one KPI. The operations further comprise transmit a first message towards the network node comprising the predicted at least one KPI and a predicted time horizon for the predicted at least one KPI.

In other embodiments, a UE adapted to perform operations for an adaptive prediction of a time horizon for at least one KPI in a wireless network is provided. The operations comprise receive from a network node a ML model to predict the at least one KPI. The operations further comprise transmit a first message towards the network node comprising the predicted at least one KPI and a predicted time horizon for the predicted at least one KPI.

In other embodiments, a computer program comprising program code to be executed by processing circuitry of a UE for an adaptive prediction of a time horizon for at least one KPI in a wireless network is provided. Execution of the program code causes the UE to perform operations. The operations comprise receive from a network node a ML model to predict the at least one KPI. The operations further comprise transmit a first message towards the network node comprising the predicted at least one KPI and a predicted time horizon for the predicted at least one KPI.

In other embodiments, a computer program product comprising a non-transitory storage medium including program code to be executed by processing circuitry a UE for an adaptive prediction of a time horizon for at least one KPI in a wireless network is provided. Execution of the program code causes the UE to perform operations. The operations comprise receive from a network node a ML model to predict the at least one KPI. The operations further comprise transmit a first message towards the network node comprising the predicted at least one KPI and a predicted time horizon for the predicted at least one KPI.

Certain embodiments may provide one or more of the following technical advantages. Based on a UE determining a predicted time horizon, the UE may avoid use of trial and error to determine what can be achieved; and re-training and reconfiguration of the ML model may be avoided. Moreover, because the predicted time horizon can be provided by the UE (as well as by a network node updating a predicted time horizon), resources may be allocated in advance

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a block diagram of an information element (IE) that illustrates components of a predicted buffer status report (BSR) medium access control (MAC) control element (CE) in accordance with some embodiments of the present disclosure;

FIG. 8 is a block diagram illustrating a core network CN node (e.g., an AMF node, an SMF node, etc.) according to some embodiments of the present disclosure;

FIGS. 9 and 10 are flow charts illustrating operations of network node according to some embodiments of the present;

DETAILED DESCRIPTION

Figure 2:
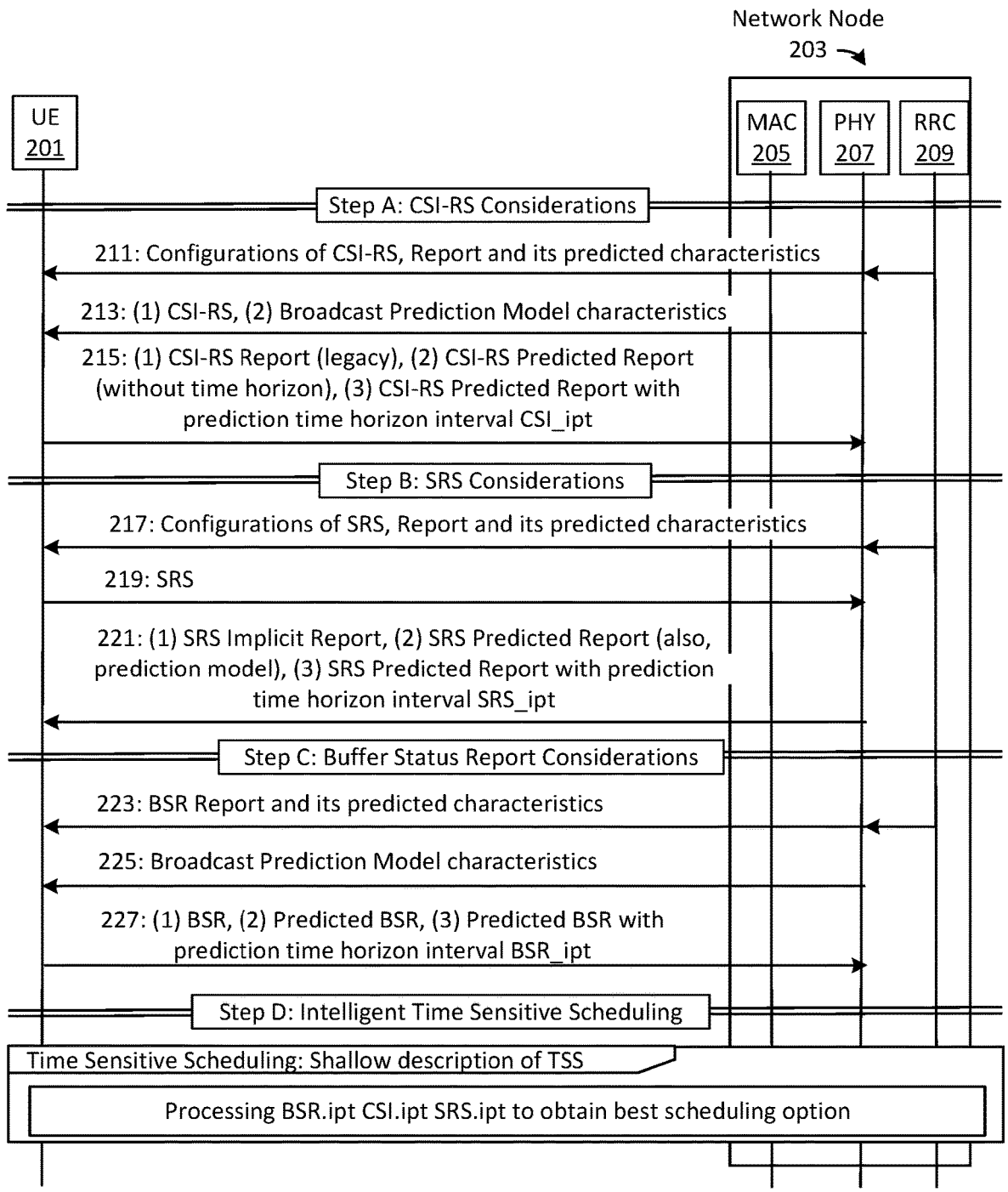
FIG. 2 is a signaling diagram illustrating operations related to a predicted CSI-reference signal (CSI-RS), sounding reference signal (SRS), and/or a BSR in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As referenced above, in existing approaches for performing link adaptation, a UE can produce different types of reports regarding CSI including (i) periodic/aperiodic reports about CSI data that contain current measurements about the channel as acquired by each UE; and (ii) predictive reports about CSI data that provide possible future states of the channel using different predictive models that can have a varying time horizon for a number of future timesteps that they predict in advance.

In existing approaches, however, a problem may arise when there is variance in the time horizon each UE has in the case of the predictive models (also referred to herein as "ML models"). Moreover, in existing approaches, this problem may occur easily because such reports (that is, predictive reports) are not controlled by the network in the same way as periodic/aperiodic reports where the network determines the periodicity. Instead, such reports are governed by the capability of each UE in terms of hardware/software (e.g., available CPU/memory, storage of past datapoints, hardware acceleration, etc.) and by how well each ML model performs given available ground truth. As a consequence, if a UE fails to get the expected accuracy for a given time horizon, the UE re-tries in a trial and error process using a smaller time horizon (e.g., instead of trying to predict channel state information for the next 2 hours, the UE re-tries for the next 1-hour, and so on).

Such a discrepancy may be problematic including, without limitation, for the following reasons. Since, in existing approaches, a UE cannot determine the time horizon, the UE falls back to trial and error to determine what can be achieved. Such a trial and error approach may be wasteful since, in each case, the ML model may need to be re-trained and configured accordingly. Moreover, such a discrepancy may be problematic from the perspective of a radio base station resource scheduler because the scheduler may not be able to allocate resources in advance when dealing with predictions of variable time horizons since such predictions carry different guarantees about their validity.

Predictions from reinforcement learning (RL) may be used to perform link adaptation and other radio essential functions, such as resource allocation. However, when predicting a KPI (e.g., reference signal received power (RSRP), buffer status report (BSR), etc.), prediction granularity of a time horizon may play an important part in accuracy of the RL model depending on training of the RL model.

Discussions related Third Generation Partnership Project (3GPP) meetings, have referred to a time horizon of a prediction. For example, in Chairman notes related to an August 2021 meeting for R3-214220, it was mentioned that RAN3 agrees, as high-level principle, that an artificial intelligence (AI)/ML model used in a model inference function needs to be initially trained, validated and tested before deployment; but it is a matter for future further study as to whether and how to signal metrics and validity time together with or as part of the inference output.

Thus, there is a need for predicted time horizon(s) used to perform link adaptation and other radio essential functions, such a resource allocation, using AI/ML.

Certain aspects of the disclosure and their embodiments may provide solutions to these or other challenges.

In various embodiments, a method is provided for adaptive prediction of a time horizon for at least one KPI in a wireless network. The method includes transmitting towards a UE a ML model to predict the at least one KPI. The method further includes receiving from the UE a first message comprising the predicted at least one KPI and a predicted time horizon for the predicted at least one KPI.

In some embodiments, an information element (IE) of an existing legacy report in a technical standard (e.g., a 3GPP technical standard) is extended to include a prediction period or a time horizon per report.

In some embodiments, a feedback loop is included between a network scheduler and a UE. The inclusion of the feedback loop may enable reconfiguration of the predicted time horizon of such reports.

Some embodiments include and describe features that utilize a predictive report from (i) different layers of a protocol stack, (ii) multiple UEs, and/or (iii) multi neighbor cells (e.g., serving cells and neighboring cells), and with corresponding different prediction time horizons that may enhance network performance.

Some embodiments include AI/(ML operations (i) to utilize different reports with different time horizon predictions. The different reports may enable highly efficient use-cases; and/or (ii) to provide a feedback loop between a network scheduler and UE. The feedback loop may enable reconfiguration of the prediction time horizon of such reports.

Some embodiments include predictions via a network decision or via a UE most quality of service (QoS) valued metric.

Some embodiments include operations for interactive decision of a time horizon of a prediction at the UE, which may improve a central function (e.g., a scheduler at a network node, such as a gNB or eNB).

Certain embodiments may provide one or more of the following technical advantages. Based on a UE determining a predicted time horizon, the UE may avoid use of trial and error to determine what can be achieved; and re-training and reconfiguration of the ML model may be avoided. Moreover, because the predicted time horizon can be provided by the UE (as well as the UE and/or a network node updating a predicted time horizon based on feedback), resources may be allocated in advance.

Extension of an IE in an existing legacy report will now be discussed further. Example embodiments are provided herein for two example use cases that are relevant to scheduling multiple UEs: (1) a CSI-RS report; and (2) a buffer status report (BSR).

An example embodiment including a CSI-reference signal (RS) report is now discussed. 3GPP TS 38.331 V 16.6.0, Radio Resource Control (RRC) Protocol Specification includes an IE used to configure a periodic or semi-persistent report sent on a physical uplink control channel (PUCCH) on the cell in which the CSI-ReportConfig is included, or to configure a semi-persistent or aperiodic report sent on physical uplink shared channel (PUSCH) triggered by downlink control information (DCI) received on the cell in which the CSI-ReportConfig is included (in this case, the cell on which the report is sent is determined by the received DCI).

In some embodiments a pred-CSI-ReportConfig IE includes the following:

```
pred-CSI-ReportConfig ::=                SEQUENCE {
  reportConfigId                           pred-CSI-ReportConfigId,
  carrier                                  ServCellIndex                    OPTIONAL,  -- Need S
  resourcesForChannelMeasurement              CSI-ResourceConfigId,
  csi-IM-ResourcesForInterference             CSI-ResourceConfigId          OPTIONAL, -- Need R
  nzp-CSI-RS-ResourcesForInterference         CSI-ResourceConfigId          OPTIONAL,  -- Need R
  reportConfigType                         CHOICE {
    pred-Periodic                            SEQUENCE {
      reportSlotConfig                         CSI-ReportPeriodicityAndOffset,
      pucch-CSI-ResourceList                   SEQUENCE (SIZE (1..maxNrofBWPs)) OF PUCCH-CSI-Resource
    },
    pred-SemiPersistentOnPUCCH               SEQUENCE {
      reportSlotConfig                         CSI-ReportPeriodicityAndOffset,
      pucch-CSI-ResourceList                   SEQUENCE (SIZE (1..maxNrofBWPs)) OF PUCCH-CSI-Resource
    },
    Pred-SemiPersistentOnPUSCH               SEQUENCE {
      reportSlotConfig                         ENUMERATED {s15, sl10, sl20, sl40, sl80, sl160, sl320},
      reportSlotOffsetList                     SEQUENCE (SIZE (1..maxNrofUL-Allocations)) OF INTEGER(0..32),
      p0alpha                                  P0-PUSCH-AlphaSetId
    },
    pred-Aperiodic                           SEQUENCE {
      reportSlotOffsetList                     SEQUENCE (SIZE (1..maxNrofUL-Allocations)) OF INTEGER(0..32)
    }
  },
```

In some embodiments, a new parameter is added to the IE (e.g., a pred-CSI-ReportConfig IE) for a predicted time horizon of a reported CSI prediction (referred to herein as a "predicted time horizon" or "pred-Time-Horizon" information or IE). In some embodiments, the pred-Time-Horizon parameter specifies a relevant time horizon of a reported CSI prediction in the ped-CSI-ReportConfig IE, and can be defined as follows:

```
pred-Time-Horizon                     SEQUENCE {
    reportTimeHorizonOffsetList         SEQUENCE (SIZE (1..maxNrofSlotPredictoin)) OF INTEGER(0..10024)
}
```

In some embodiments, the pred-Time_Horizon parameter is specified per each reported function/measure including, without limitation, the following reports: (a) a predicted time horizon of a reported time prediction (e.g., pred-Time-Horizon-Time); (b) a predicted time horizon of a reported antenna report metric prediction (e.g., pred-Time-Horizon-AntennaPort); (c) a predicted time horizon of a reported channel quality indicator (CQI) prediction (e.g., pred-Tim-Horizon-CQI); (d) a predicted time horizon of a reported layer indicator (LI) prediction (e.g., pred-Time-Horizon-LI); (e) a predicted time horizon of a reported reference signal received power (RSRP) metric prediction (e.g., pred-Time-Horizon-RSRP); and (f) a predicted time horizon of a reported pre-coding matrix indicator (PMI) prediction (e.g., pred-Time-Horizon-PMI).

Example embodiments including a BSR is now discussed. 3GPP TS 38.331 V 16.6.0, Radio Resource Control (RRC) Protocol Specification includes an IE, BSR-Config, used to configure buffer status reporting.

In some embodiments, a predicted BSR configuration (e.g., "pred-BSR-Config") includes the following:

```
Pred-BSR-Config ::=      SEQUENCE {
   Pred-periodicBSR-Timer     ENUMERATED { sf1, sf5, sf10, sf16, sf20, sf32, sf40,
sf64,
                         sf80, sf128, sf160, sf320, sf640, sf1280, sf2560, infinity },
   Pred-retxBSR-Timer         ENUMERATED { sf10, sf20, sf40, sf80, sf160, sf320,
sf640, sf1280, sf2560,
                         sf5120, sf10240, spare5, spare4, spare3, spare2, spare1},
   ...
}
```

3GPP TS 38.321 V 16.6.0, Medium Access Control (MAC) Protocol Specification includes a BSR MAC CE, including a long BSR format (variable size). The fields in the BSR MAC CE include a logical channel group ID (LCG ID) that identifies the group of logical channel(s) whose buffer status is being reported. The fields also include, for the long BSR format, a logical control group ($LCG_i$ field). This field indicates the presence of a buffer size field for the logical channel group i. The $LCG_i$ field set to 1 indicates that the buffer size field for the logical channel group I is reported. The $LCG_i$ field set to 0 indicates that the buffer size field for the logical channel group i is not reported. The fields further include a buffer size field. The buffer size field identifies the total amount of data available according to a data volume calculation procedure across all logical channels of a logical channel group after the MAC Protocol Data Unit (PDU) has been built (i.e. after the logical channel prioritization procedure, which may result the value of the Buffer Size field to zero).

FIG. 1 is a block diagram of an IE that illustrates components of a predicted BSR MAC CE in accordance with some embodiments of the present disclosure. In the example embodiment of FIG. 1, eight logical control groups (LCG_0-LCG_7) are identified in row 1 for October 1. Predicted buffer size 1 and predicted buffer size 2 are included for all eight LCGs for October 2 and October 3, respectively. Predicted buffer size m is included for all eight LCGs for a future day in October (i.e., October m+1). A value of a predicted time horizon for all eight LCGs is included in the sixth row of FIG. 1.

In another embodiment, a predicted time horizon is enabled for each LCG.

Linking of reports on prediction with time horizon procedures will now be discussed. The time horizon procedures include procedures in a radio access network (RAN) to obtain information on radio channel and user traffic.

FIG. 2 is a signaling diagram illustrating operations related to predicted CSI-RS, SRS, and BSR in accordance with some embodiments of the present disclosure. Referring to the example embodiment of FIG. 2, UE 201 (also referred to herein as "UE_i") is the i'th UE; CSI-RS is the channel state information reference signal, CSI_ipt, BSR_ipt, SRS_ipt are the CSI, BSR, SRS reports (or a part of a report) from i'th UE at (or with) prediction time horizon 'pt'. An example of a predicted time horizon is 1024 os, which is the next 1024 orthogonal frequency division multiplexing (OFDM) symbol from this report time. The network can consider different parts of CSI/SRS, and BSR reports in addition to a QoS requirement, quality of service flow identifier (QFI) flow, and/or radio bearer to make a scheduling decision.

Still referring to FIG. 2, in some embodiments, procedures in Step-A, Step-B, and/or Step-C can be performed in sequence or in parallel.

In some embodiments, Step A includes the following CSI-RS considerations.

In operation 211, radio resource control layer 209 (RRC 209) of network node 203 sends physical layer (PHY) 207 and UE 201 a CSI report from a legacy perspective, a predictive reporting perspective, or a predictive with time-horizon perspective.

In operation 213, PHY 207 sends to all UEs, including UE 201, a (1) CSI reference signal, and/or (2) a prediction model on how to predict the CSI (including input feature(s), model structure, and output).

In operation 215, UE 201 sends network node 203 one or more of the following messages: (1) a legacy CSI-RS Report, 2) a CSI-RS Predicted Report without Time-Horizon, and/or 3) a CSI-RS Predicted Report with prediction interval (also referred to herein as "CSI_ipt", "pred-Time-Horizon" report, or "predicted time horizon" report).

Still referring to FIG. 2, in some embodiments, Step B includes the following SRS considerations.

In operation 217, RRC 209 of network node 203 sends PHY 207 and UE 201 a SRS measurement or report either from a legacy perspective, a predictive reporting perspective, or a predictive with time-horizon perspective.

In operation 219, UE 201 sends network node 203 a SRS (e.g., a legacy SRS).

In operation 221, network node 203 reports to UE 201 (1) a relevant extraction of the SRS (e.g., legacy SRS reporting is not as explicit as CSI report), (2) a predicted SRS report can be explicit, and/or (3) a predicted SRS report with time horizon interval report (e.g., SRS_ipt).

Still referring to FIG. 2, in some embodiments, Step C includes the following BSR considerations.

In operation 223, RRC 209 of network node 203 sends PHY 207 and UE 201 sends UEs, including UE 201, BSR configurations and its prediction configuration (e.g., interval).

In operation 225, network node 203 sends/broadcasts to UEs, including UE 201, BSR model characteristics including, e.g., input features, model structure, and output.

In operation 227, UE 201 reports to network node 203 one or more of the following reports: (1) a legacy BSR, (2) a predicted BSR without time horizon, and/or (3) a predicted BSR with prediction time horizon interval (e.g., BSR_ipt).

Still referring to FIG. 2, in some embodiments, Step D includes operations for performing scheduling (e.g., intelligent time sensitive scheduling (TSS)). Network node 203 processes one or more of the reports from Steps A, B, an/or C to obtain a scheduling option (e.g., a best scheduling option). As part of the processing, network node 203 can process collected radio channel prediction information (downlink (DL)/uplink (UL)), a BSR, QFI, 5G quality of service identifier (5QI) index, etc. with different time horizons of prediction. In addition to determining a scheduling option, the processing can also include a feedback option on how to tune the predicted time horizon to optimize the scheduler. Further discussion of Step D is included herein.

Figure 3:
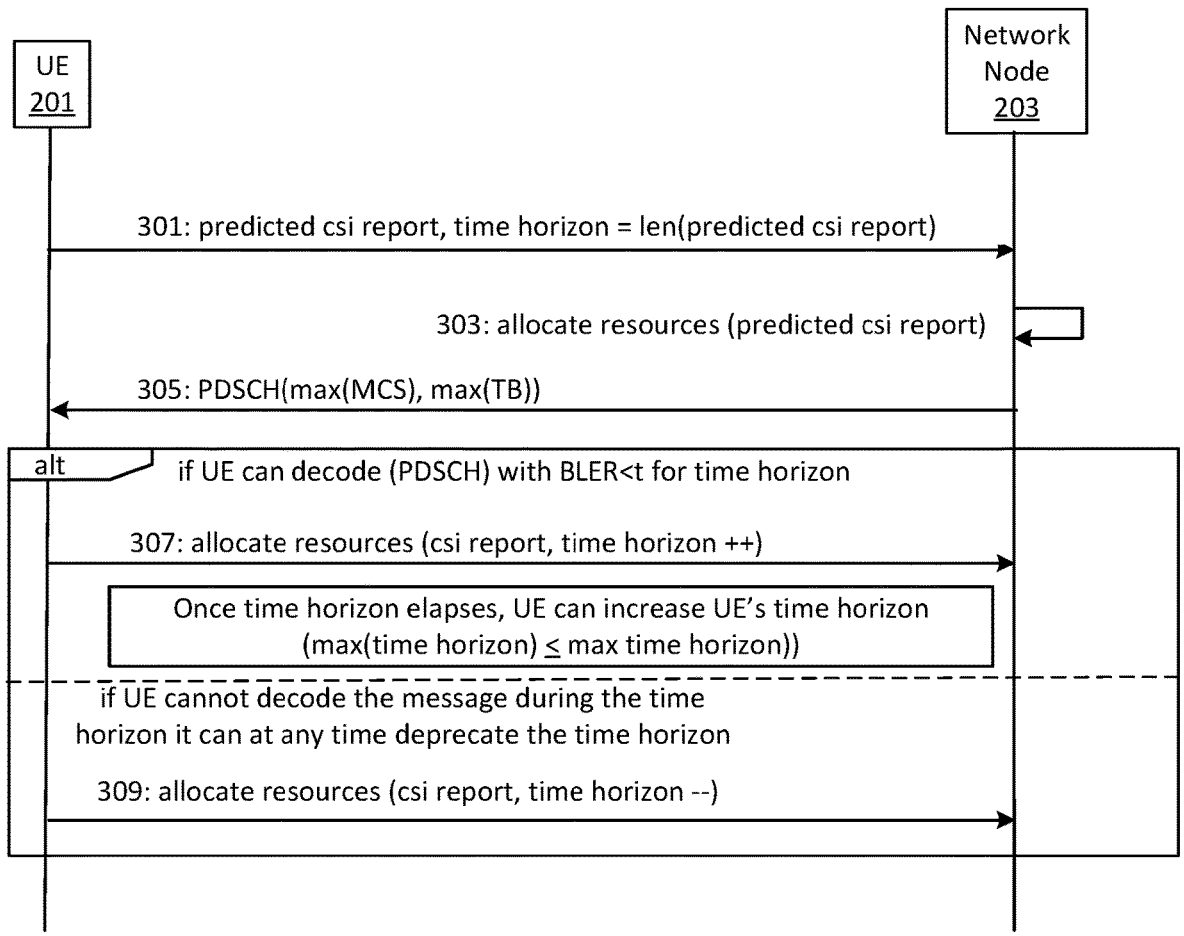
FIG. 3 is a signaling diagram illustrating operations related to time horizon updates (also referred to herein as time horizon adaptation) in accordance with some embodiments of the present disclosure.

FIG. 3 is a signaling diagram illustrating operations related to time horizon updates (also referred to herein as time horizon adaptation) in accordance with some embodiments of the present disclosure. In operation 301, UE 201 sends a report and the predicted time horizon (e.g., a predicted CSI report and time horizon) to network node 203. In operation 303, network node 203 allocates resources based on the predicted report (e.g., the predicted CSI report). In operation 305, network node 203 sends to UE 201 physical data shared channel (PDSCH) data including a maximum modulation coding scheme (MCS) and a maximum transport block (TB).

Still referring to FIG. 3, in some embodiments, time horizon adaptation of the report (e.g., the predictive CSI report(s)) is performed by leveraging the successes or failures that occur when resources are allocated by the network node's 203 (and other network nodes) radio resource management (RRM) module given the duration that each allocation lasts compared to the time horizon. In some embodiments, if no link adaptation occurs before the time horizon expires, the existing horizon is a good match and can be sustained or increased (operation 307 in FIG. 3). In some embodiments, if link adaptation occurs and new resources need to be allocated, the time horizon is reduced (operation 309 in FIG. 3).

In another embodiment, a reinforcement learning (RL) agent (per network node) learns how to propose a new time horizon for each UE.

RL can be used to train a ML model to make a sequence of decisions. In some embodiments, RL is used to train a ML model on how to amend/update the time horizon of the prediction that is made per parameter (or function) of each UE in such a way that it reduces the number of link adaptations that need to be performed by the a radio resource manager of a network node.

In some embodiments, RL includes the following four elements.
(1) A RL agent which hosts the process that learns how to configure the time horizon. In some embodiments, that process can reside within the network node (e.g., an eNB or gNB) or in some other network element that has similar state space or consumes input from the network node.
(2) An environment which is an umbrella term that includes every input that the RL agent uses to learn how to amend the time horizon. In some embodiments, the environment can either be physical or virtual. In some embodiments, the RL agent is trained in a virtual environment at first and afterwards, once the reward that the RL agent manages to accumulate for its actions is high enough, the RL agent graduates and can be deployed in the physical world where it can continue training and learn from its actions.
(3) An action. In some embodiments, the RL agent enforces its decision on its environment. In some embodiments, a UE can receive an IE, e.g., as discussed herein with an amended/updated time horizon. In some embodiments, the RL agent observes the effect of that action and learns from it via the state space provided by the environment.
(4) A reward. In some embodiments, a reward is a function which lets the RL agent know how well it did when it performed an amendment/update of the time horizon. In some embodiments, the RL agent learns to maximize or minimize this function as it tries different actions.

In some embodiments, the state space includes tuples.

In an example embodiment, the tuples record the following:

| Category | Parameter | Description |
|---|---|---|
| action | Time_horizon | The time horizon of the predictive model measured in n time steps where a time step can be any measurement of time such as seconds, minutes, hours, days etc. This is represented as a positive integer number. |
| State | Link_adaptation_time_point | The point in time also measured in time steps where link adaptation occurs on the network node. This is defined in reference to the time where the network node used the original time_horizon coming from the UE and performed resource allocation. Using that as a reference, time steps are incrementally measured from that moment and on. This is also represented as a positive integer number |
| State | Ue_modality | The modality of the UE - whether the UE is mobile or if it is stationary (i.e., a stationary IoT sensor). |
| State | Current_CSI_state | The current CSI state information at the moment when the predicted CSI_state report was transmitted. |
| State | (Optional) location_of_UE | The location of the UE. This information is optional and does not need to be transmitted by the UE. Instead, it can be derived from the RSRP measurements that the UE is transmitting along with the CSI report. |

| Category | Parameter | Description |
|---|---|---|
| State | (Optional) ue_manufacturer | The manufacturer of the UE. This is useful information since it can be used to approximate the type of antenna that the UE has when such information is not available |
| Reward | T - Throughput | Throughput between UE and network node |
| Reward | L - Latency | Latency between UE and network node |
| State | UE profile | The profile of the UE which can be collected from the Home Subscriber System (HSS). This can help determine the UE's expectation in terms of throughput and latency |

Action space includes the set of actions permitted to the RL agent. In some embodiments, the set of actions include increase the time_horizon, or decrease the time_horizon. Such actions can enable maintaining an action space of 2^N where n is the size of the state space.

Reward functions will now be discussed further. A goal of resource allocation can be to allocate enough resources for the UE to try to ensure high enough throughput and low latency throughout the lifetime of the allocation which is governed by the mobility of the UE and from its profile. For example, a UE that does not move around and expects low throughput and high latency can rely on high time horizons as its environment is static in comparison to a UE that is very mobile and requires as low as possible latency and high throughput (e.g., a user carrying a smartphone).

In some embodiments, the following equation explains a reward function that learns to reward the process based on the experience that the resource allocation offers to the UE:

$$r = \frac{w_1 |E_T - C_T|}{T_T} + \frac{w_2 |E_L - C_L|}{T_L}$$

This equation is a weighted approach that can be tuned to emphasize throughput or latency accordingly. $E_T$ denotes the expected throughput and $C_T$ denotes the current throughput. $T_T$ denotes the total available throughput and, in the same fashion, $E_L$, $C_L$ and $T_L$ denote the expected, current and total latency.

Figure 4:
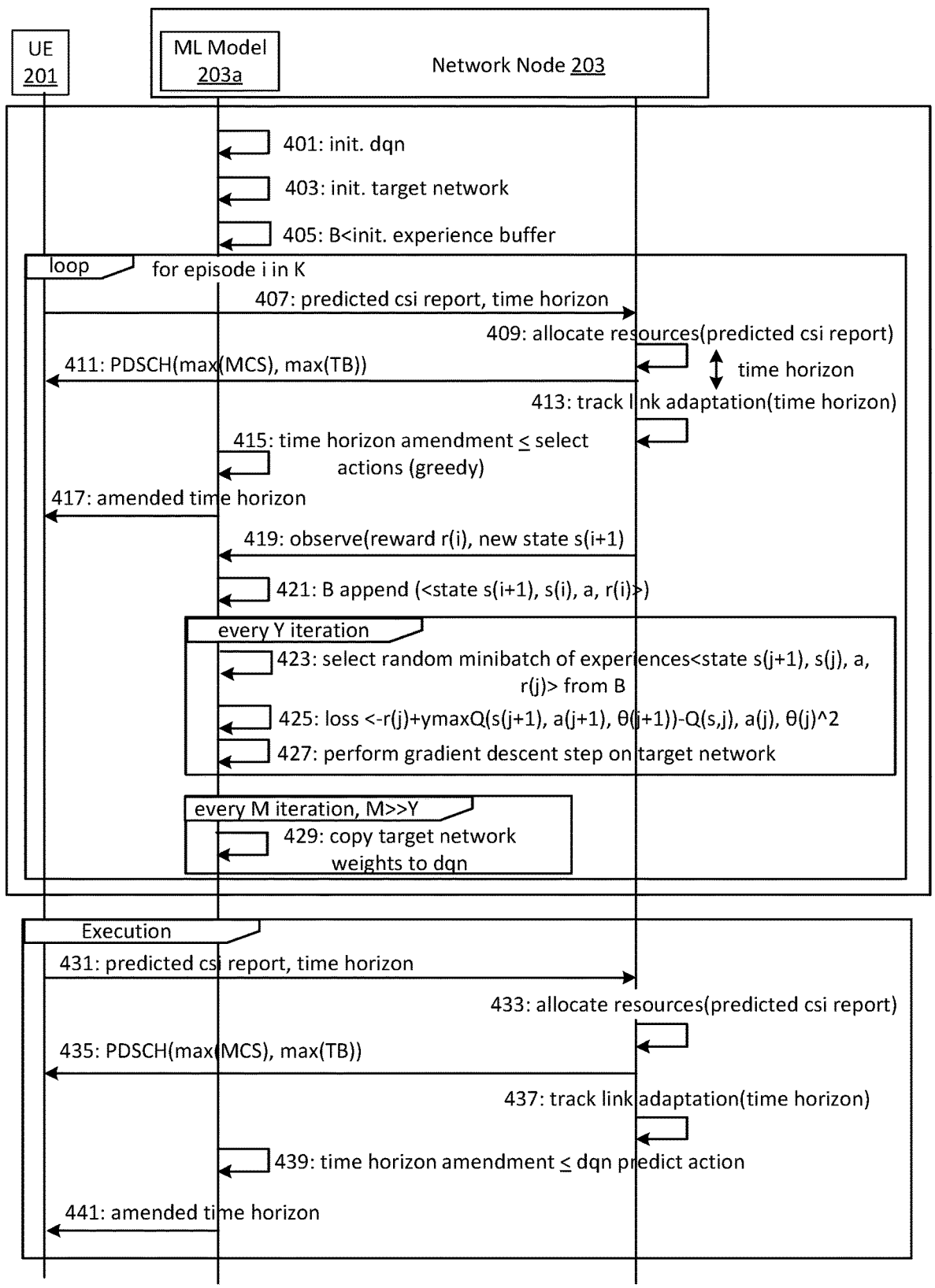
FIG. 4 is a sequence diagram illustrating operations of an example embodiment for training a RL agent and for using a trained RL agent in accordance with some embodiments of the present disclosure.

FIG. 4 is a sequence diagram illustrating operations of an example embodiment for training a RL agent and for using a trained RL agent in accordance with some embodiments of the present disclosure. In some embodiments, the trained RL agent is not re-trained from the environment in cases for control of the process while omitting further learning (e.g., in environments where part of the state space becomes unavailable or in cases where there are not sufficient resources to train such agents).

In the example embodiment of FIG. 4, in operation 401, a ML model 203a (e.g. a Deep Q-Learning network (DQN)) is initialized. In some embodiments, the DQN is a neural network that learns to associate state with action.

In operation 403, to avoid the non-stationarity, a target network is employed that can be updated periodically using input from the DQN (as opposed to the DQN that can be updated more frequently). Afterwards (in operation 429), the target network replaces the DQN.

In operation 405, an experience buffer is initialized to collect experiences (that is, states and actions) within each episode for a set of K episodes.

In operation 407, UE 201 sends a report (e.g., a CSI report) to network node 203.

In operation 409, network node 203 associates a set of resources for UE 201.

In operation 411, a physical channel is created between network node 203 and UE 201.

In operation 413, longevity of that channel is tracked, e.g., how long until UE 201 requests a new channel. For example, if a block error rate (BLER) is lower than a defined value t, a new channel is not requested.

In operation 415, an E-greedy (epsilon-greedy) policy is used to choose whether to amend the time horizon or not given the current state.

In operation 417, the time_horizon is amended/updated based on the output of operation 415.

In operation 419, a reward is observed of that action in relation to the state.

In operation 421, this experience is recorded in buffer B.

Operations 423-427 take place every Y iteration assuming enough samples have been collected in B.

In operation 425, the DQN is trained using mini batches from B using the default loss function in DQN.

In operation 427, gradient descent is performed to minimize the loss function.

In operation 429, the target network weights are copied to th DQN.

Operation 429 is performed every M iteration, where M>>Y iteration.

Operations 431-441 are performed in an independent execution phase without any learning where the target network replaces the DQN.

In operation 431, UE 201 sends a report (e.g., a CSI report) to network node 203.

In operation 433, network node 203 associates a set of resources for UE 201.

In operation 435, a physical channel is created between network node 203 and UE 201.

In operation 437, longevity of the channel created is tracked, e.g., how long until UE 201 requests a new channel if, e.g., a block error rate (BLER) is lower than t.

In operation 439, unlike operation 415, an E-greedy policy is not used. Rather, the learnings of the DQN are used to choose whether to amend/update the time horizon or not.

In operation 441, the amended/updated time horizon is communicated to UE 201.

Feedback mechanisms to a UE for enhancement of prediction report characteristics, including a predicted time horizon, for a next iteration are now discussed further.

In some embodiments, a single IE is included for updating the time horizon of prediction for both CSI and BSR. In some embodiments, the IE can be an RRC parameter, and can be independent (that is, consider absolute values of time-horizon) or dependent (that is, consider relevant values to existing IE).

In some embodiments, the IE allows the CSI/RSRP report (e.g., RRCReconfiguration) configuration to change the time horizon of UE prediction not the reporting occasion.

In some embodiments, the IE allows the BSR report configuration to change the time horizon of UE prediction not the reporting occasion.

Example embodiments of the IE are as follows:

```
pred-ReconfigTimeHorizonSA ::=    SEQUENCE {
    timeHorizon-CSIConfig         ENUMERATED {sl5, sl10, sl20, sl40, sl80, sl160,
sl320, ....},
    timeHorizon-BSRConfig         ENUMERATED {sl5, sl10, sl20, sl40, sl80, sl160,
sl320, ....},
}
pred-ReconfigTimeHorizonNSA ::=   SEQUENCE {
    timeHorizon-CSIConfig         ENUMERATED {sl5, sl10, sl20, sl40, sl80, sl160,
sl320, ....},
    timeHorizon-BSRConfig         ENUMERATED {sl5, sl10, sl20, sl40, sl80, sl160,
sl320, ....},
}
```

In some embodiments, a downlink control information (DCI) element is included for updating the time horizon of prediction for both CSI and BSR, e.g., such that the element could be a physical downlink control channel (PDCCH) parameter. In an example embodiment, this can be accommodated on PDCCH Format 2_0 or 2_1 since it goes to a group of UEs.

Referring again to FIG. 4, in some embodiments, operations 417 and 441 use the IE of the above embodiments to reach over to each UE and amend/update the expected time horizon.

In some embodiments, the method includes multi path and/or frequency selective time horizon prediction. In an example embodiment for frequency selectivity, predicting the average of all frequencies or paths is included.

Figure 5:
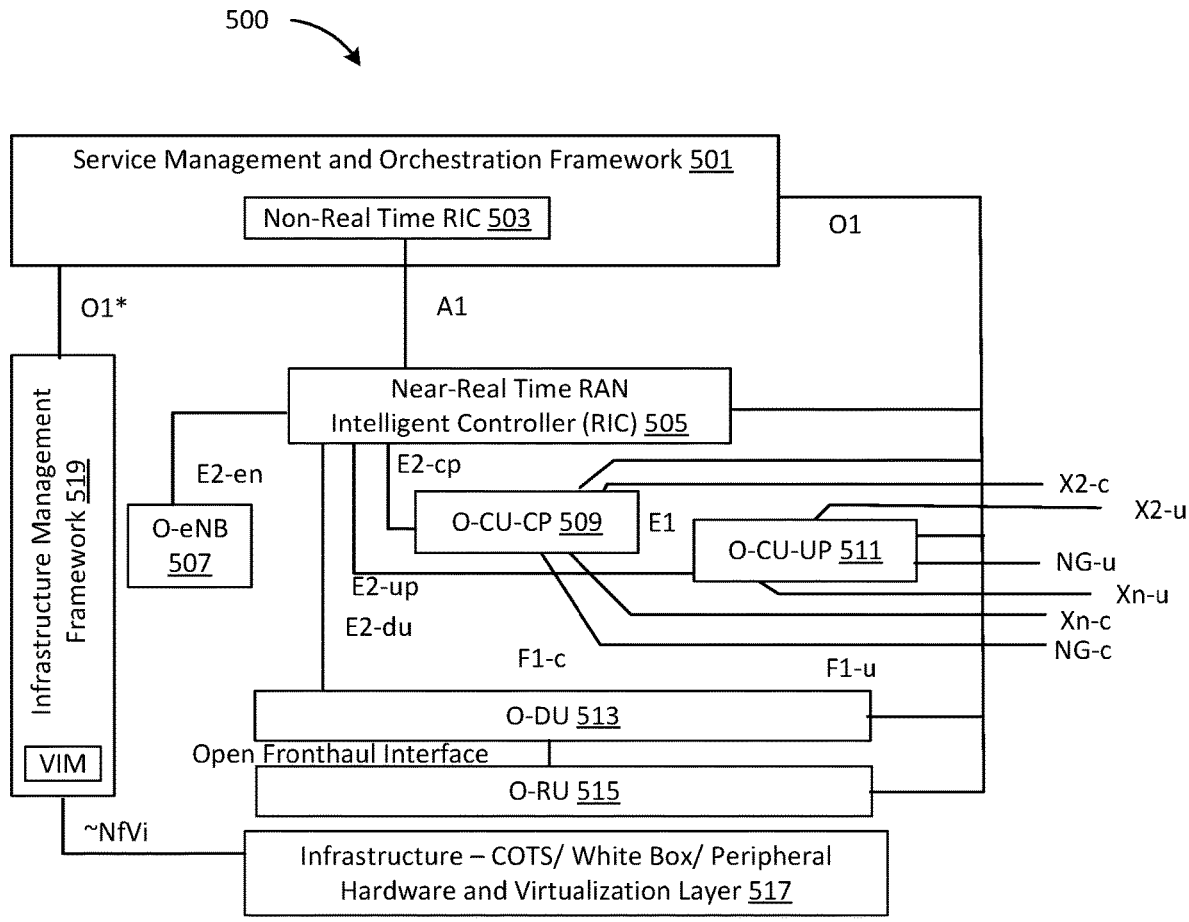
FIG. 5 is a block diagram illustrating an overview of an Open RAN (ORAN) architecture.

FIG. 5 is a block diagram illustrating an overview of an Open RAN (ORAN) architecture. In the ORAN architecture 500, the radio side includes near-real time RAN RIC 505, O-CU-CP 509, O-CU-UP 511, O-DU 513, and O-RU 515. Near-real time RAN RIC 505 is communicatively connected to ORAN eNodeB (O-eNB) 507. The management side includes SMO Framework 501 that includes a non-real time RIC 503 function. The O1 interface enables access to performance management (PM) and configuration management (CM) information from O-DUs and O-RUs. The O1* interface enables access to infrastructure management framework 519. Infrastructure management structure 519 is communicatively connected to infrastructure 517 (e.g., COTS, white box, peripheral hardware, virtualization layers, etc.)

In another embodiment, in ORAN architecture, the RL agent can be implemented as a near real-time RIC xAPP and as such rely on O-x interfaces (such as O-eNB 507) to retrieve data from each eNB. As described herein, the network node (e.g., eNB) collects time horizon requests and contains the resource management module. The resource management module maintains information on how frequent link adaptations take place, thus, asserting the longevity of each resource allocation per eNB per predicted time horizon.

Figure 6:
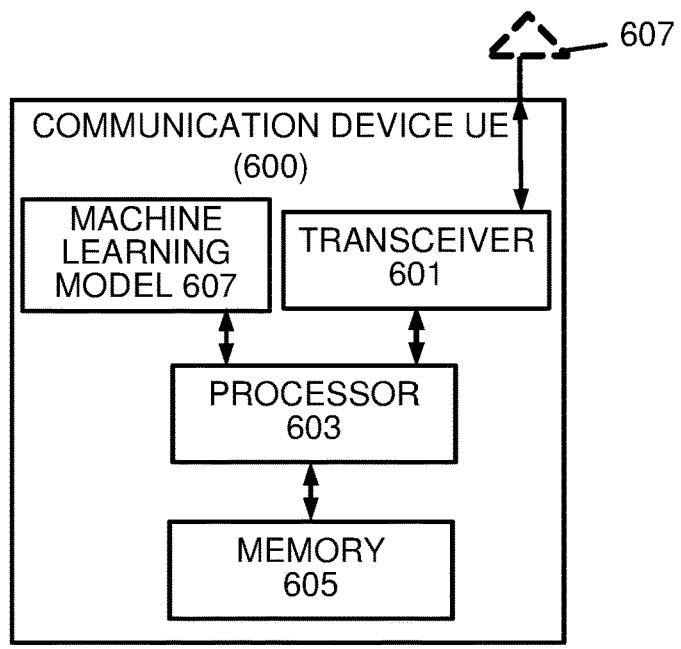
FIG. 6 is a block diagram illustrating a communication device (e.g., a UE) according to some embodiments of the present disclosure.

FIG. 6 is a block diagram illustrating elements of a communication device UE 600 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 600 may be provided, for example, as discussed below with respect to wireless devices UE QQ112A, UE QQ112B, and wired or wireless devices UE QQ112C, UE QQ112D of FIG. 13, UE QQ200 of FIG. 14, and virtualization hardware QQ504 and virtual machines QQ508A, QQ508B of FIG. 17, all of which should be considered interchangeable in the examples and embodiments described herein and be within the intended scope of this disclosure, unless otherwise noted.) As shown, communication device UE may include an antenna 607 (e.g., corresponding to antenna QQ222 of FIG. 14), and transceiver circuitry 601 (also referred to as a transceiver, e.g., corresponding to interface QQ212 of FIG. 14 having transmitter QQ218 and receiver QQ220) including a transmitter and a receiver configured to provide uplink and downlink radio communications with a base station(s) (e.g., corresponding to network node QQ110A, QQ110B of FIG. 13, and network node QQ300 of FIG. 15) of a radio access network. Communication device UE may also include processing circuitry 603 (also referred to as a processor, e.g., corresponding to processing circuitry QQ202 of FIG. 14, and control system QQ512 of FIG. 17) coupled to the transceiver circuitry, and memory circuitry 605 (also referred to as memory, e.g., corresponding to memory QQ210 of FIG. 13) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that separate memory circuitry is not required. Communication device UE may also include an interface (such as a user interface) coupled with processing circuitry 603, and/or communication device UE may be incorporated in a vehicle.

As discussed herein, operations of communication device UE may be performed by processing circuitry 603 and/or transceiver circuitry 601. For example, processing circuitry 603 may control transceiver circuitry 601 to transmit communications through transceiver circuitry 601 over a radio interface to a radio access network node (also referred to as a base station) and/or to receive communications through transceiver circuitry 601 from a RAN node over a radio interface. The communication device UE 600 may also include a machine learning (ML) model 607 coupled to processor 603 and/or memory 605. In some embodiments, ML model 607 can be connected to a wireless network and can transmit and receive information in accordance with some embodiments of the present disclosure. Moreover, modules may be stored in memory circuitry 605, and these modules may provide instructions so that when instructions of a module are executed by processing circuitry 603, processing circuitry 603 performs respective operations (e.g., operations discussed below with respect to Example Embodiments relating to UEs). According to some embodiments, a communication device UE 600 and/or an element(s)/function(s) thereof may be embodied as a virtual node/nodes and/or a virtual machine/machines.

Figure 7:
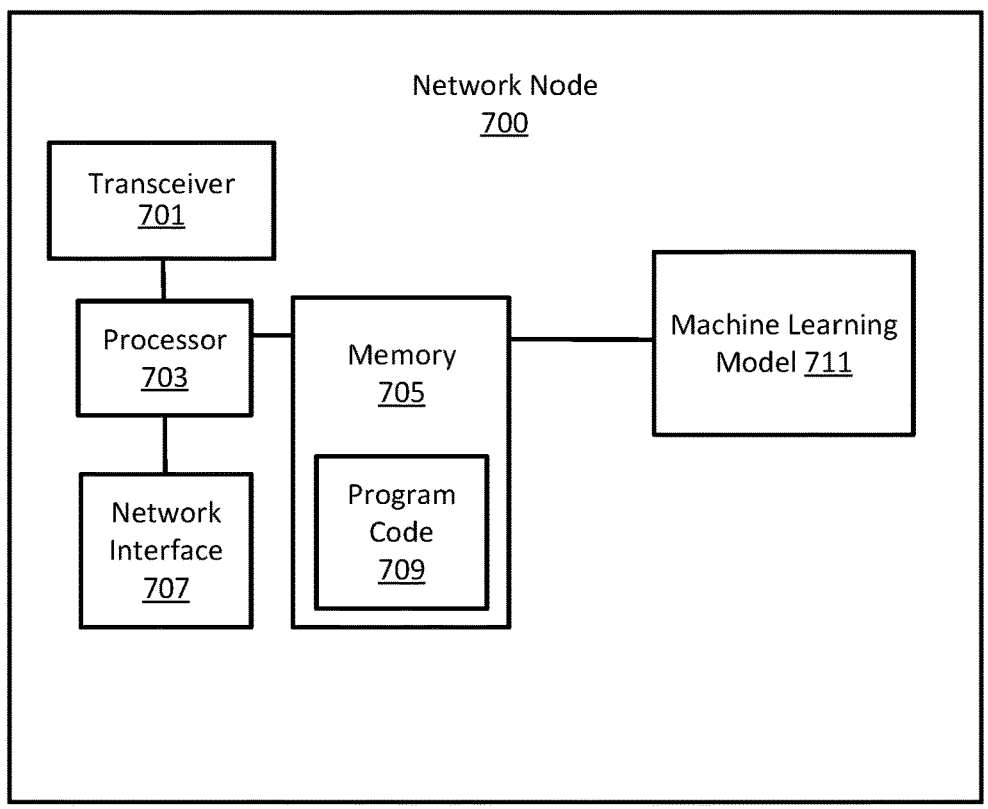
FIG. 7 is a block diagram illustrating a network node (e.g., a radio base station, eNB/gNB) according to some embodiments of the present disclosure.

FIG. 7 is a block diagram illustrating elements of a radio access network, RAN, network node 700 (also referred to as a network node, base station, radio base station, eNodeB/eNB, gNodeB/gNB, etc.) of a Radio Access Network (RAN) configured to provide cellular communication according to embodiments of inventive concepts. (RAN node 700 may be provided, for example, as discussed below with respect to network node QQ110A, QQ110B of FIG. 13, network node QQ300 of FIG. 15, and hardware QQ504 and/or virtual machine QQ508A, QQ508B of FIG. 17, all of which should be considered interchangeable in the examples and embodiments described herein and be within the intended scope of this disclosure, unless otherwise noted.) As shown, the RAN node may include transceiver circuitry 701 (also referred to as a transceiver, e.g., corresponding to portions of RF transceiver circuitry QQ312 and radio front end circuitry QQ318 of FIG. 15) including a transmitter and a receiver configured to provide uplink and downlink radio communications with mobile terminals. The RAN node may include network interface circuitry 707 (also referred to as a network interface, e.g., corresponding to portions of communication interface QQ306 of FIG. 15) configured to provide communications with other nodes (e.g., with other base stations) of the RAN and/or core network CN. The network node may also include processing circuitry 703 (also referred to as a processor, e.g., corresponding to processing circuitry QQ302 of FIG. 15) coupled to the transceiver circuitry, and memory circuitry 705 (also referred to as memory, e.g., corresponding to memory QQ304 of FIG. 15) coupled to the processing circuitry. The processor 703 is configured to execute computer program code 709 in the memory 705, described herein as a non-transitory computer readable medium, to perform at least some of the operations described herein as being performed by any one or more elements of network node 700. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required. The network node may also include a machine learning (ML) model 711 coupled to memory 705 and/or processor 703. In some embodiments, ML model 711 can be connected to a wireless network and can transmit and receive information in accordance with some embodiments of the present disclosure.

As discussed herein, operations of the RAN node may be performed by processing circuitry 703, network interface 707, and/or transceiver 701. For example, processing circuitry 703 may control transceiver 701 to transmit downlink communications through transceiver 701 over a radio interface to one or more mobile terminals UEs and/or to receive uplink communications through transceiver 701 from one or more mobile terminals UEs over a radio interface. Similarly, processing circuitry 703 may control network interface 707 to transmit communications through network interface 707 to one or more other network nodes and/or to receive communications through network interface from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to network nodes). According to some embodiments, RAN node 700 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figures 8, 9:
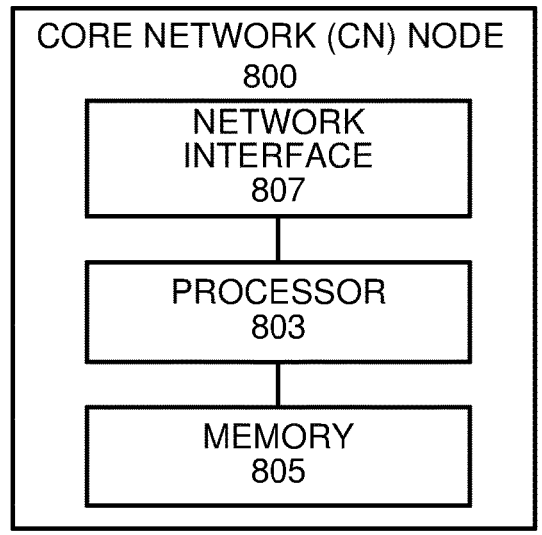

FIG. 8 is a block diagram illustrating elements of a core network (CN) node (e.g., an SMF (session management function) node, an AMF (access and mobility management function) node, etc.) of a wireless network configured to provide cellular communication according to embodiments of inventive concepts. (CN node 800 may be provided, for example, as discussed below with respect to core network node QQ108 of FIG. 13, or hardware QQ504 or virtual machine QQ508A, QQ508B of FIG. 17, all of which should be considered interchangeable in the examples and embodiments described herein and be within the intended scope of this disclosure, unless otherwise noted). As shown, the CN node may include network interface circuitry 807 configured to provide communications with other nodes of the core network and/or the radio access network RAN. The CN node may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the CN node may be performed by processing circuitry 803 and/or network interface circuitry 807. For example, processing circuitry 803 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations. According to some embodiments, CN node 800 and/or an element(s)/function(s) thereof may be embodied as a virtual node/nodes and/or a virtual machine/machines.

Operations of a network node (e.g., network node 203 implemented using the structure of FIG. 7) will now be discussed with reference to the flow chart of FIGS. 9 and 10 according to embodiments of the present disclosure. In the description that follows, while the network node may be any of the RAN node 700, network node QQ110A, QQ110B, QQ300, QQ606, hardware QQ504, or virtual machine QQ508A, QQ508B, the RAN node 700 shall be used to describe the functionality of the operations of the network node. For example, modules may be stored in memory 705 of FIG. 7, and these modules may provide instructions so that when the instructions of a module are executed by respective RAN node processing circuitry 703, processing circuitry 703 performs respective operations of the flow charts.

Referring first to FIG. 9, a method performed by a network node (203, 700) for an adaptive prediction of a time horizon for at least one KPI in a wireless network is provided. The method includes transmitting (901) towards a UE a ML model to predict the at least one KPI. The method further includes receiving (903) from the UE a first message including the predicted at least one KPI and a predicted time horizon for the predicted at least one KPI.

Referring now to FIG. 10, in some embodiments, the method further includes using (1001) an original time horizon received from the UE to perform resource allocation for the UE and establish a channel between the network node and the UE; and tracking (1003) a longevity of the channel between the network node and the UE. The method further includes updating (1005) the predicted time horizon for the predicted at least one KPI based on the longevity of the channel; and transmitting (1007) to the UE the updated time horizon.

In some embodiments, the longevity is determined based on a defined value for a block error rate, BLER, of data receipt at the UE.

In some embodiments, the method further includes providing (1009) feedback to the UE. The feedback includes information to enable the UE to update the predicted time horizon of the UE for a next training iteration.

In some embodiments, the feedback is provided at one of a plurality of levels of a control plane protocol stack of the network node.

In some embodiments, the information includes an information element, the information element comprising one of a radio resource control, RRC, parameter and a downlink control information, DCI, element specific to the updating (1005) the predicted time horizon for the predicted at least one KPI.

In some embodiments, the feedback is based on optimizing an experience that the resource allocation provided to the UE.

In some embodiments, the optimizing is based on an optimization algorithm comprising a reward function.

In some embodiments, the ML model is deployed in an execution phase without further learning, and the method further includes receiving (1011) a second message from the UE including a change to the predicted time horizon for a future time period. The change includes one of an increase to the predicted time horizon or a decrease to the predicted time horizon based on a duration of the resource allocation compared to the predicted time horizon.

In some embodiments, the increase in the predicted time horizon occurs when a link adaptation does not occur before the predicted time horizon expires, and the decrease in the predicted time horizon occurs responsive to an occurrence of a link adaptation and a new resource allocation.

In some embodiments, the transmitting to the UE the amended time horizon obviates performance of a link adaptation by the network node for the UE.

In some embodiments, the second message received from the UE includes an information element. The information element includes the predicted time horizon for the predicted at least one KPI.

In some embodiments, the predicted at least one KPI includes at least one or more of (i) a predicted channel state information reference signal, CSI-RS, report, (ii) a predicted buffer status report, BSR, (iii) predicted antenna port metric, (iv) a predicted channel quality indicator, CQI, (v) a predicted layer indicator, LI, (vi) a predicted reference signal received power, RSRP, metric, and (vii) a predicted precoding matrix indicator, PMI.

In some embodiments, the information element includes components of (i) a predicted medium access control element, MAC CE, (ii) the predicted time horizon for all logical control groups, LCG, included in the MAC CE, or (iii) the predicted time horizon per LCG.

The various operations from the flow chart of FIG. 10 may be optional with respect to some embodiments of a method performed by a network node.

In the description that follows, while the UE may be any of the communication device 600, wireless device QQ112A, QQ112B, wired or wireless devices UE QQ112C, UE QQ112D, UE QQ200, virtualization hardware QQ504, virtual machines QQ508A, QQ508B, or UE QQ606, the communication device 600 shall be used to describe the functionality of the operations of the communication device. Operations of the UE 600 (implemented using the structure of the block diagram of FIG. 6) will now be discussed with reference to the flow charts of FIGS. 11 and 12 according to some embodiments of inventive concepts. For example, modules may be stored in memory 605 of FIG. 6, and these modules may provide instructions so that when the instructions of a module are executed by respective UE processing circuitry 603, processing circuitry 603 performs respective operations of the flow charts.

Figure 11:
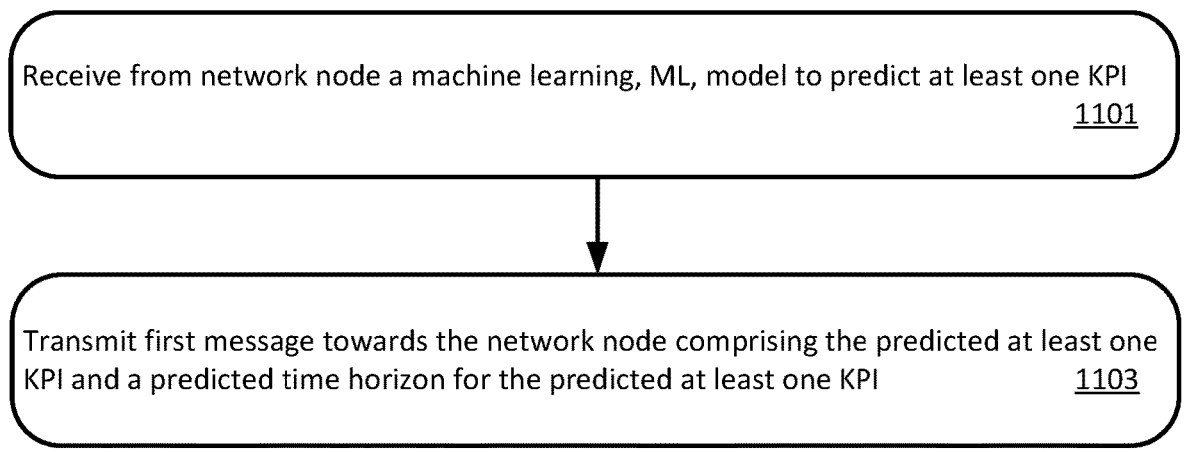
FIGS. 11 and 12 are flow charts illustrating operations of a UE according to some embodiments of the present disclosure.

Referring first to FIG. 11, a method performed by a UE (201, 600) for an adaptive prediction of a time horizon for at least one KPI in a wireless network is provided. The method includes receiving (1101) from a network node a ML model to predict the at least one KPI. The method further includes transmitting (1103) a first message towards the network node comprising the predicted at least one KPI and a predicted time horizon for the predicted at least one KPI.

Figure 12:
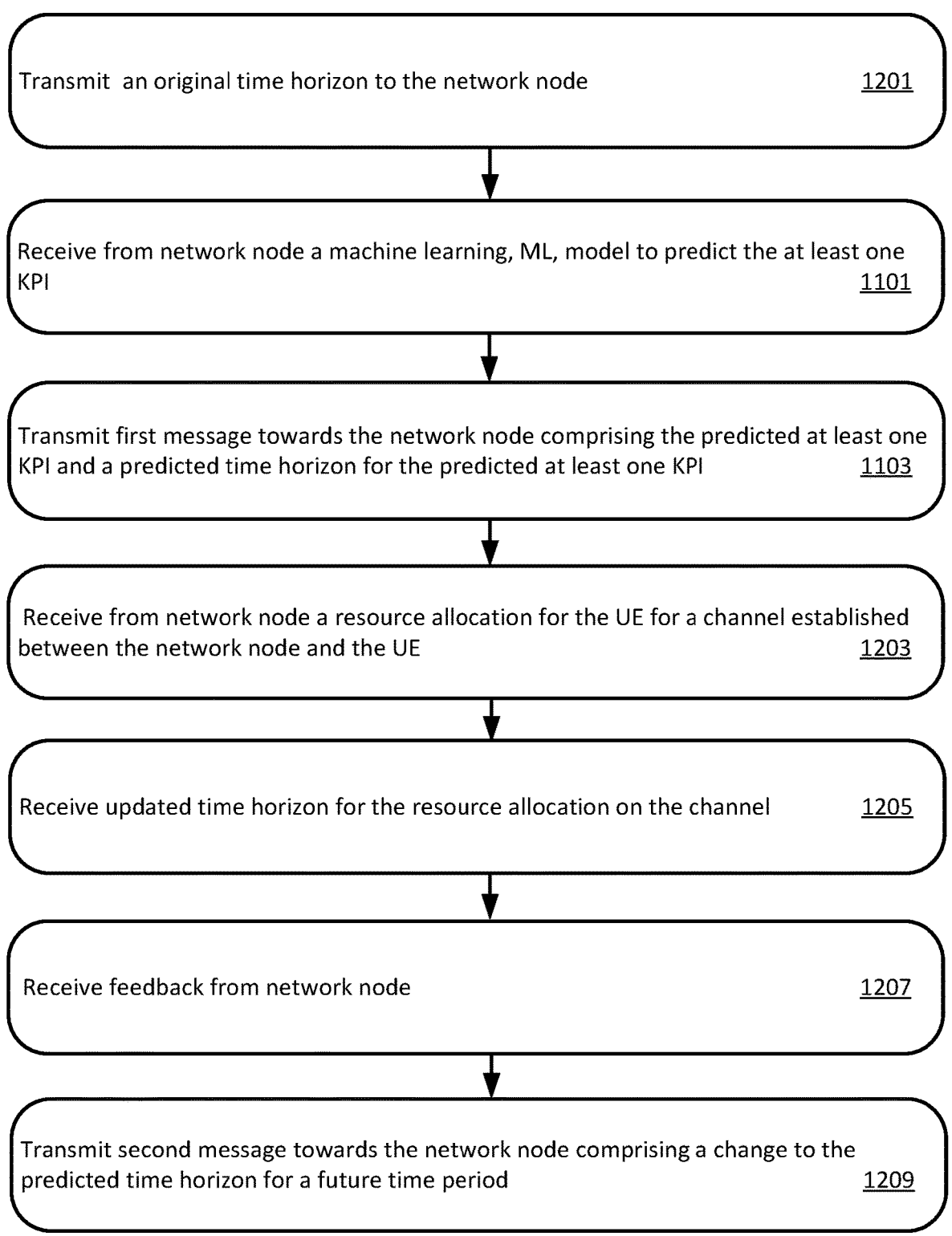

Referring now to FIG. 12, in some embodiments, the method further includes transmitting (1201) an original time horizon to the network node; receiving (1203) from the network node, a resource allocation for the UE for a channel established between the network node and the UE; and receiving (1205) an updated time horizon for the resource allocation on the channel from the network node.

In some embodiments, the method further includes receiving (1207) feedback from the network node. The feedback contains information to enable the UE to update the predicted time horizon of the UE for a next training iteration.

In some embodiments, the feedback is provided from one of a plurality of levels of a control plane protocol stack of the network node.

In some embodiments, the information includes an information element. The information element includes one of a radio resource control, RRC, parameter and a downlink control information, DCI, element specific to updating the predicted time horizon for the predicted at least one KPI.

In some embodiments, the feedback is based on optimizing an experience that the resource allocation provided to the UE.

In some embodiments, the optimizing is based on an optimization algorithm comprising a reward function.

In some embodiments, the ML model is deployed in an execution phase without further learning, and the method further includes transmitting (1209) a second message towards the network node comprising a change to the predicted time horizon for a future time period. The change includes one of an increase to the predicted time horizon or a decrease to the predicted time horizon based on a duration of the resource allocation compared to the predicted time horizon.

In some embodiments, the increase in the predicted time horizon occurs when a link adaptation does not occur before the predicted time horizon expires, and the decrease in the predicted time horizon occurs responsive to an occurrence of a link adaptation and a new resource allocation.

In some embodiments, the receiving the updated time horizon obviates performance of a link adaptation by the network node for the UE.

In some embodiments, the second message includes an information element, the information element comprising the predicted time horizon for the predicted at least one KPI.

In some embodiments, the predicted at least one KPI includes at least one of (i) a predicted channel state information reference signal, CSI-RS, report, (ii) a predicted buffer status report, BSR, (iii) predicted antenna port metric, (iv) a predicted channel quality indicator, CQI, (v) a predicted layer indicator, LI, (vi) a predicted reference signal received power, RSRP, metric, and (vii) a predicted precoding matrix indicator, PMI.

In some embodiments, the information element includes components of (i) a predicted medium access control element, MAC CE, (ii) the predicted time horizon for all logical control groups, LCG, included in the MAC CE, or (iii) the predicted time horizon per LCG.

The various operations from the flow chart of FIG. 12 may be optional with respect to some embodiments of a method performed by a UE.

Although UE 600 and network node 700 are illustrated in the example block diagrams of FIGS. 6 and 7 each may represent a device that includes the illustrated combination of hardware components, other embodiments may comprise communication devices and network nodes with different combinations of components. It is to be understood that each of a UE and a network node comprise any suitable combination of hardware and/or software needed to perform the tasks, features, functions, and methods disclosed herein. Moreover, while the components of each of a UE and a network node are depicted as single boxes located within a larger box, or nested within multiple boxes, in practice, each device may comprise multiple different physical components that make up a single illustrated component (e.g., a memory may comprise multiple separate hard drives as well as multiple RAM modules).

Figure 13:
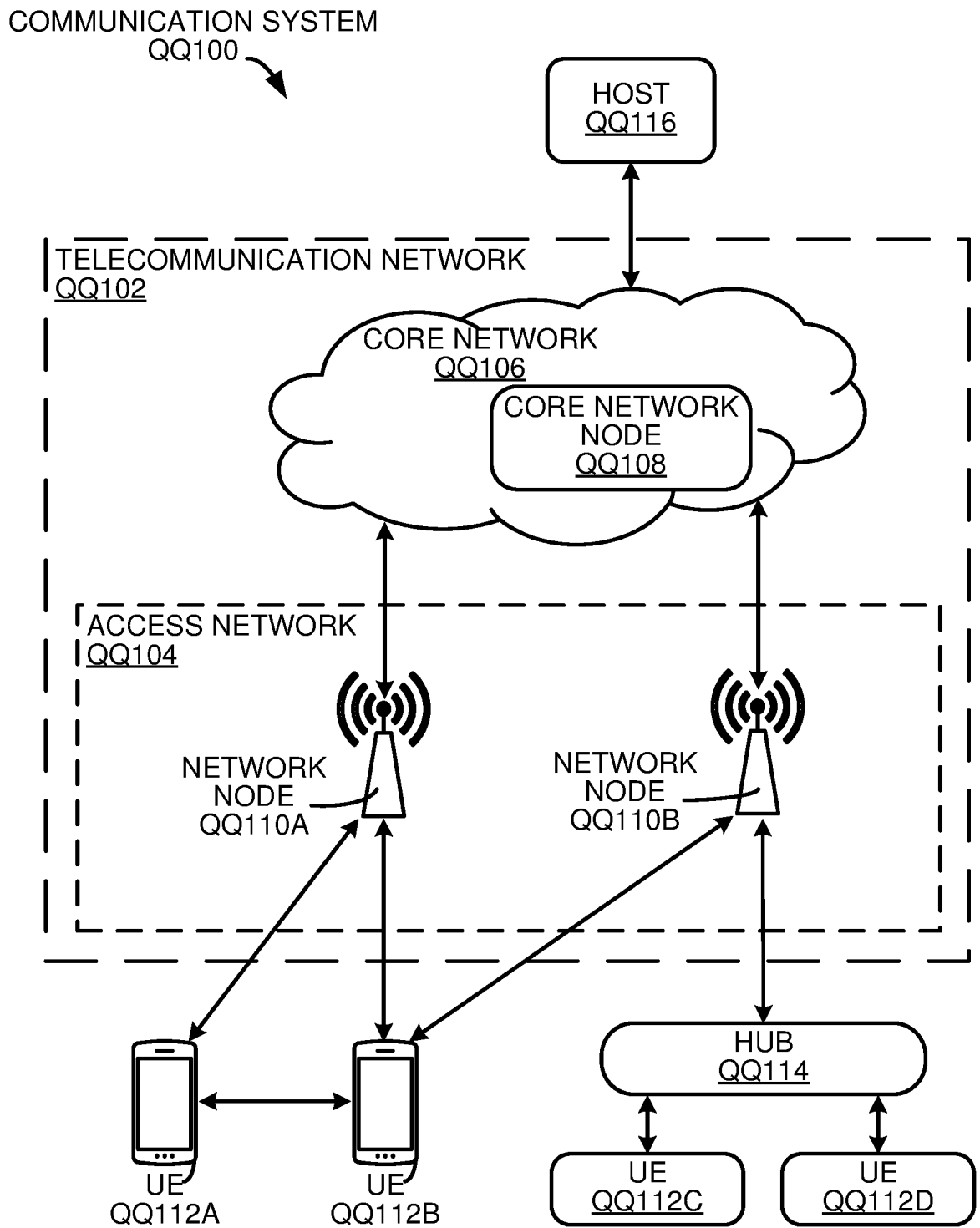
FIG. 13 is a block diagram of a communication system in accordance with some embodiments of the present disclosure.

FIG. 13 shows an example of a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110a and QQ110b (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112a, QQ112b, QQ112c, and QQ112d (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 13 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

Figure 14:
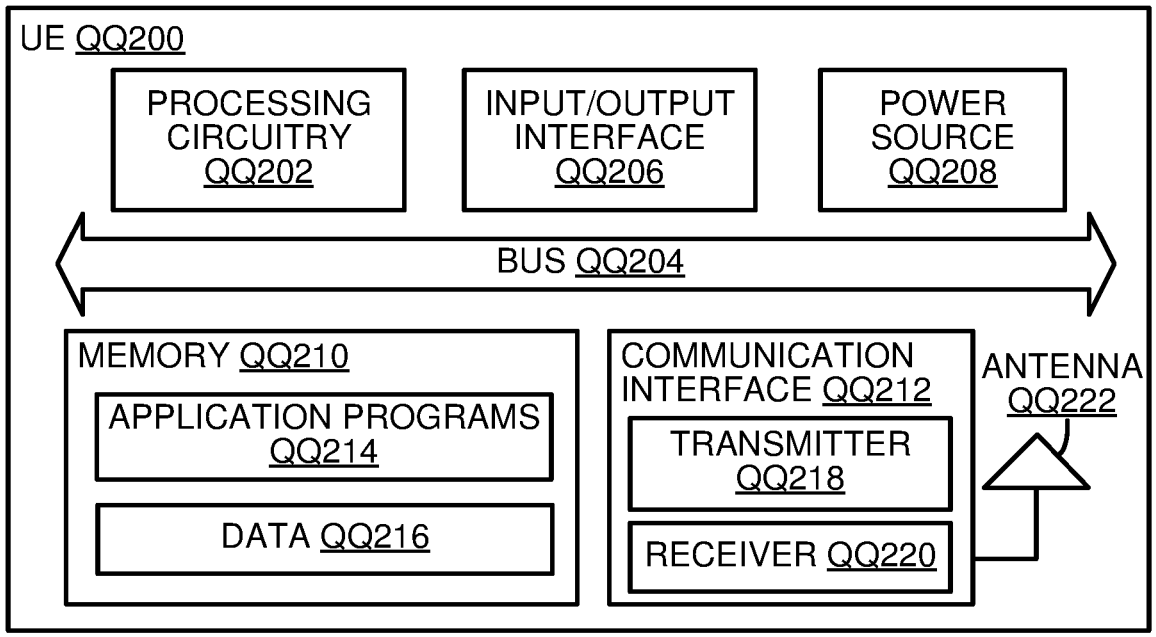
FIG. 14 is a block diagram of a user equipment in accordance with some embodiments of the present disclosure.

FIG. 14 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 14.

The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 14.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 15:
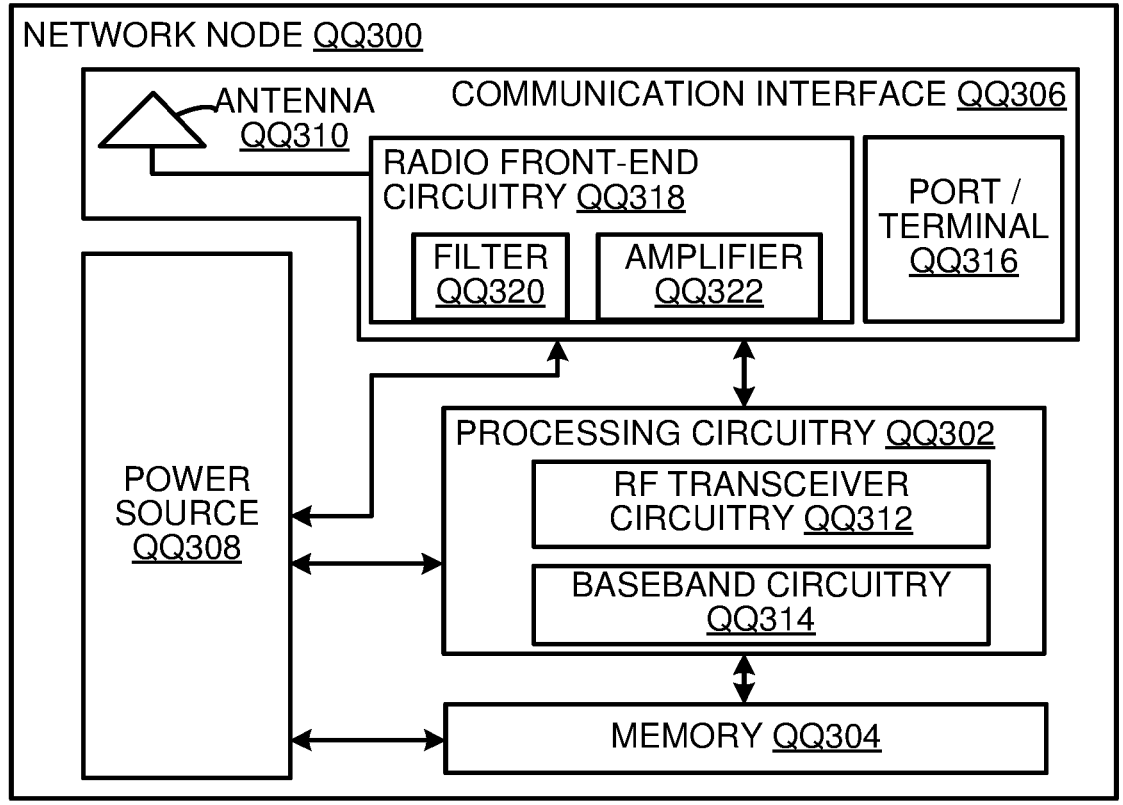
FIG. 15 is a block diagram of a network node in accordance with some embodiments of the present disclosure.

FIG. 15 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 15 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 16:
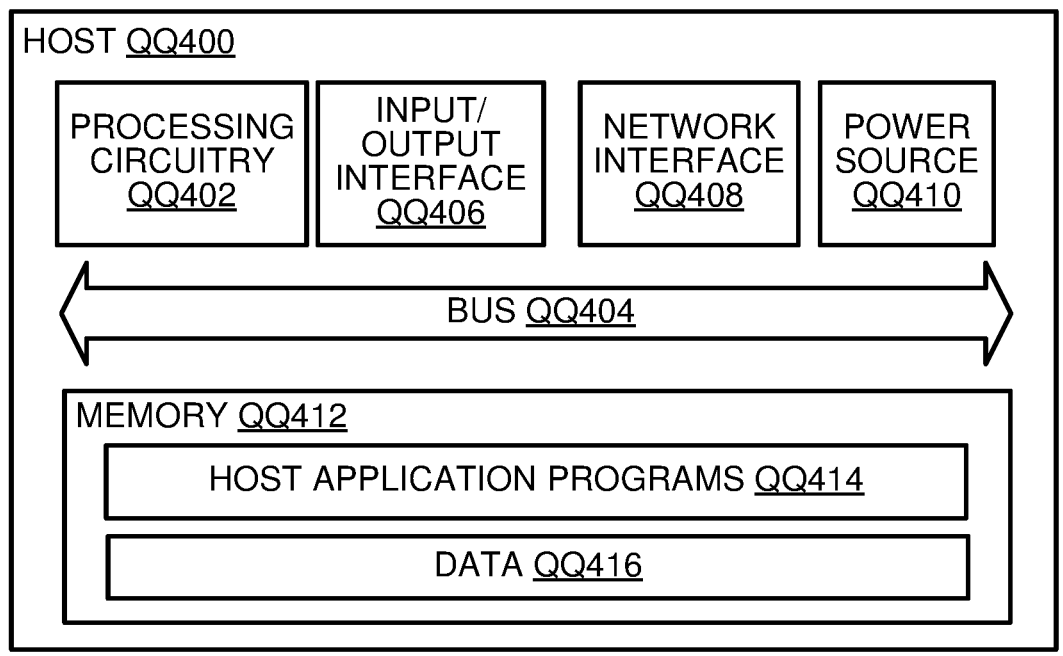
FIG. 16 is a block diagram of a host computer communicating with a user equipment in accordance with some embodiments of the present disclosure.

FIG. 16 is a block diagram of a host QQ400, which may be an embodiment of the host QQ116 of FIG. 13, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as Figures QQ2 and QQ3, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 17:
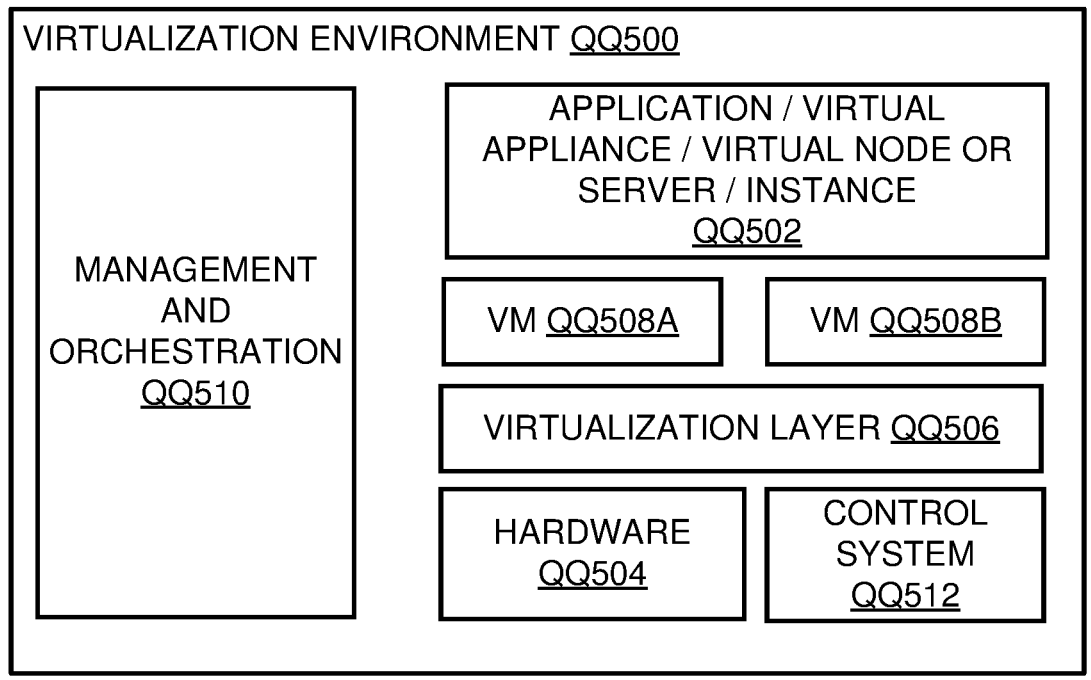
FIG. 17 is a block diagram of a virtualization environment in accordance with some embodiments of the present disclosure.

FIG. 17 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed by a network node for an adaptive prediction of a time horizon for at least one key performance indicator, KPI, in a wireless network, the method comprising:

using an original time horizon received from a user equipment, UE, to perform resource allocation for the UE and establish a channel between the network node and the UE;

transmitting towards the UE, a machine learning, ML, model to predict the at least one KPI;

receiving from the UE a first message comprising the predicted at least one KPI and a predicted time horizon for the predicted at least one KPI;

tracking a longevity of the channel between the network node and the UE;

updating the predicted time horizon for the predicted at least one KPI based on the longevity of the channel; and transmitting to the UE the updated time horizon.

2. The method of claim 1, wherein the longevity is determined based on a defined value for a block error rate, BLER, of data receipt at the UE.

3. The method of claim 1, further comprising:
providing feedback to the UE, the feedback comprising information to enable the UE to update the predicted time horizon of the UE for a next training iteration.

4. The method of claim 3, wherein the feedback is provided at one of a plurality of levels of a control plane protocol stack of the network node.

5. The method of claim 1, wherein the ML model is deployed in an execution phase without further learning, and further comprising:
receiving a second message from the UE comprising a change to the predicted time horizon for a future time period, the change comprising one of an increase to the predicted time horizon or a decrease to the predicted time horizon based on a duration of the resource allocation compared to the predicted time horizon.

6. The method of claim 5, wherein the increase in the predicted time horizon occurs when a link adaptation does not occur before the predicted time horizon expires, and the decrease in the predicted time horizon occurs responsive to an occurrence of a link adaptation and a new resource allocation.

7. The method of claim 1, wherein the transmitting to the UE the amended time horizon obviates performance of a link adaptation by the network node for the UE.

8. The method of claim 1, wherein the predicted at least one KPI comprises at least one or more of (i) a predicted channel state information reference signal, CSI-RS, report, (ii) a predicted buffer status report, BSR, (iii) predicted antenna port metric, (iv) a predicted channel quality indicator, CQI, (v) a predicted layer indicator, LI, (vi) a predicted reference signal received power, RSRP, metric, and (vii) a predicted pre-coding matrix indicator, PMI.

9. A method performed by a user equipment, UE, for an adaptive prediction of a time horizon for at least one key performance indicator, KPI, in a wireless network, the method comprising:
transmitting an original time horizon to a network node;
receiving from the network node a machine learning, ML, model to predict the at least one KPI;
transmitting a first message towards the network node comprising the predicted at least one KPI and a predicted time horizon for the predicted at least one KPI;
receiving from the network node, a resource allocation for the UE for a channel established between the network node and the UE; and
receiving an updated time horizon for the resource allocation on the channel from the network node.

10. The method of claim 9, further comprising:
receiving feedback from the network node, the feedback containing information to enable the UE to update the predicted time horizon of the UE for a next training iteration.

11. The method of claim 10, wherein the feedback is provided from one of a plurality of levels of a control plane protocol stack of the network node.

12. The method of claim 10, wherein the information comprises an information element, the information element comprising one of a radio resource control, RRC, parameter and a downlink control information, DCI, element specific to updating the predicted time horizon for the predicted at least one KPI.

13. The method of claim 10, wherein the feedback is based on optimizing an experience that the resource allocation provided to the UE.

14. The method of claim 9, wherein the ML model is deployed in an execution phase without further learning, and further comprising:
transmitting a second message towards the network node comprising a change to the predicted time horizon for a future time period, the change comprising one of an increase to the predicted time horizon or a decrease to the predicted time horizon based on a duration of the resource allocation compared to the predicted time horizon.

15. The method of claim 14, wherein the increase in the predicted time horizon occurs when a link adaptation does not occur before the predicted time horizon expires, and the decrease in the predicted time horizon occurs responsive to an occurrence of a link adaptation and a new resource allocation.

16. The method of claim 14, wherein the second message comprises an information element, the information element comprising the predicted time horizon for the predicted at least one KPI.

17. The method of claim 9, wherein the receiving the updated time horizon obviates performance of a link adaptation by the network node for the UE.

18. The method of claim 9, wherein the predicted at least one KPI comprises at least one of (i) a predicted channel state information reference signal, CSI-RS, report, (ii) a predicted buffer status report, BSR, (iii) predicted antenna port metric, (iv) a predicted channel quality indicator, CQI, (v) a predicted layer indicator, LI, (vi) a predicted reference signal received power, RSRP, metric, and (vii) a predicted pre-coding matrix indicator, PMI.

19. A network node for an adaptive prediction of a time horizon for at least one key performance indicator, KPI, in a wireless network, the network node comprising:
at least one processor;
at least one memory connected to the at least one processor and storing program code that is executed by the at least one processor to perform operations comprising:
use an original time horizon received from a user equipment, UE, to perform resource allocation for the UE and establish a channel between the network node and the UE;
transmit towards, the UE, a machine learning, ML, model to predict the at least one KPI;
receive from the UE a first message comprising the predicted at least one KPI and a predicted time horizon for the predicted at least one KPI;
track a longevity of the channel between the network node and the UE;
update the predicted time horizon for the predicted at least one KPI based on the longevity of the channel; and
transmit to the UE the updated time horizon.

20. A user equipment, UE, for an adaptive prediction of a time horizon for at least one key performance indicator, KPI, in a wireless network, the UE comprising:
at least one processor;
at least one memory connected to the at least one processor and storing program code that is executed by the at least one processor to perform operations comprising:
transmit an original time horizon to a network node;
receive from the network node a machine learning, ML, model to predict the at least one KPI;

transmit a first message towards the network node comprising the predicted at least one KPI and a predicted time horizon for the predicted at least one KPI;
receive from the network node, a resource allocation for the UE for a channel established between the network node and the UE; and
receive an updated time horizon for the resource allocation on the channel from the network node.

* * * * *